United States Patent [19]

Merrill et al.

[11] 3,935,367

[45] Jan. 27, 1976

[54] METHOD OF RENDERING SURFACES NONFOGGING AND RESULTING ARTICLES

[75] Inventors: Richard E. Merrill, Wakefield; Arthur A. Massucco, Natick, both of Mass.

[73] Assignee: Arthur D. Little, Inc., Cambridge, Mass.

[22] Filed: Nov. 24, 1972

[21] Appl. No.: 309,332

[52] U.S. Cl. ............... 428/336; 156/325; 156/327; 106/13; 427/162; 427/163; 427/165; 428/425; 428/442; 428/463; 428/520; 260/77.5 BB; 260/859 R
[51] Int. Cl.² ..................... C08G 18/04; C09K 3/18
[58] Field of Search ........ 117/124 D, 124 E, 132 C, 117/138.8 A, 161 KP, 161 UC; 260/77.5 BB, 857 UN, 859 R; 106/13; 156/327

[56] References Cited
UNITED STATES PATENTS

| 3,257,476 | 6/1966 | Tobolsky et al. | 260/859 R |
| 3,291,859 | 12/1966 | Tobolsky et al. | 260/859 |
| 3,635,756 | 1/1972 | Shepherd et al. | 117/124 D |
| 3,719,726 | 3/1973 | Hara et al. | 260/859 R |

*Primary Examiner*—J. H. Newsome
*Attorney, Agent, or Firm*—Bessie A. Lepper

[57] ABSTRACT

A method for treating a surface of a substrate to render it nonfogging and the resulting article formed by the treatment. A thin film coating of a block copolymer containing alternating blocks of polyurethane and a hydrophilic copolyacrylic is adhered to the surface to be made nonfogging. The copolyacrylic is a copolymer of a hydroxy substituted acrylate and an ethylenically unsaturated acid such as acrylic acid. By varying the weight ratio of polyetherurethane/copolyacrylic it is possible to vary the flexibility of the coating and hence to widen the range of substrates to which the treatment is applicable, e.g., from flexible wrapping material to rigid mirrors.

27 Claims, No Drawings

METHOD OF RENDERING SURFACES NONFOGGING AND RESULTING ARTICLES

This invention relates to nonfogging coatings and to substrates with nonfogging coatings affixed thereto.

It is well known that in the presence of moisture windows, lenses, mirrors, eyeglasses, transparent wrappings and the like can become badly fogged, sometimes to the detriment of safety. Such fogging can occur on transparent or reflective surfaces formed of glass, plastics or metals. It would be very desirable to be able to apply to such surfaces a transparent coating capable of rendering them nonfogging while maintaining their required surface characteristics such as resistance to abrasion, scratching and solvents, as well as smoothness and gloss.

Transparent nonfogging coatings have been disclosed in U.S. Pat. Nos. 3,488,215, 3,515,579, 3,520,949 and 3,635,756. These nonfogging coatings of the prior art are formed of hydrophilic acrylate or methacrylate polymers which may be modified by copolymerization with a monobasic or polybasic unsaturated carboxylic acid or partial ester of the acid. The polymer may be crosslinked with a polyepoxide.

The nonfogging coatings of the prior art are relatively brittle when not plasticized with absorbed or adsorbed moisture (i.e., when not serving as a nonfogging surface) and they undergo a momentary fogging when first exposed to moisture before attaining a nonfogged state.

It is apparent that it would be desirable to have a nonfogging coating which can, if desired, exhibit flexibility, which does not undergo a preliminary fogging and which still possesses all of the other desirable characteristics of a nonfogging surface.

It is therefore a primary object to provide an improved method for treating surfaces to render them nonfogging. It is another object to provide such a method which deposits on the surfaces so treated a coating which may be formed to have controllable flexibility, which does not undergo a preliminary fogging, which is transparent and which exhibits resistance to abrasion, scratching, solvent cleaners and washing with water. An additional object is to provide a method of the character described which deposits on glass, plastic or metal surfaces a coating which exhibits good adhesion to all such surfaces.

It is another primary object of this invention to provide substrates of glass, plastic or metal (including metallized surfaces) having adhered to at least a portion of its surface a nonfogging coating which is characterized by high resistance to abrasion, scratching, solvents and water and which does not undergo a preliminary fogging before attaining a nonfogged condition when exposed to moisture. A further object of this invention is to provide flexible substrates having a flexible nonfogging coating. Still another object is to provide substrates of the character described to which the nonfogging coating remains tightly adhered over a wide range of atmospheric conditions, particularly moisture content and temperature. Other objects of the invention will in part be obvious and in part be apparent hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

In the practice of this invention, surfaces of glass, plastics and metals (including metallized objects) are made nonfogging by depositing on them a thin transparent film of a block copolymer, the blocks of which are characterized as being alternately polyurethanes and polyacrylics. The polyacrylic blocks are chosen to possess hydrophilic characteristics, and it is preferable that the polyurethane blocks also exhibit some hydrophilic characteristics without being soluble in or degradable by water.

The urethane-acrylic block polymers suitable for the practice of this invention are formed by the methods taught by Tobolsky in U.S. Pat. Nos. 3,257,476 and 3,291,859. In preparing the block copolymers a prepolymer (typically a polyether or polyester) is reacted with an isocyanate or a diisocyanate and then the isocyanate-terminated prepolymer is in turn reacted with a dual functional free radical initiator such as a hydroperoxide or dihydroperoxide and the resulting polymeric peroxycarbamate is used to polymerize a vinyl monomer to form the desired block copolymer. The formation of these block copolymers is carried out in solution. If the polymeric peroxycarbamate is isolated, it is also possible to carry out bulk or suspension polymerization. The use of an aliphatic diisocyanate and a dihydroperoxide in the synthesis of the polymeric peroxycarbamate gives rise to block copolymers of this type which are transparent and which have a very low or negligible vinyl homopolymer content. (See "Synthesis and Characterization of Some New Polymeric Peroxycarbamates" by B. M. Baysal, W. T. Short and A. V. Tobolsky in *Journal of Polymer Science:* Part A-1, Vol. 10, 909–919(1972) ) This latter method using the aliphatic diisocyanate and dihydroperoxide is preferred for forming the block copolymers used in the practice of this invention.

We have found that by forming block copolymers in the manner described by Tobolsky using hydrophilic acrylic monomers and isocyanate-terminated prepolymers which are of predetermined length to obtain the desired degree of flexibility, it is possible to use the resulting block copolymers in forming improved nonfogging coatings on surfaces. The nonfogging coatings adhere well to all types of surfaces, do not undergo a preliminary fogging prior to becoming nonfogging, and they can be formed to remain flexible in the absence of any moisture.

The monomers which are suitable for polymerization as one block of the block copolymers are the polymerizable diene and vinyl monomers which form hydrophilic polyacrylics. Among such monomers are the hydroxyalkyl acrylates such as 2-hydroxyethyl acrylate, 2-hydroxypropyl acrylate and 3-hydroxypropyl acrylate, the hydroxyalkyl methacrylates such as 2-hydroxyethyl methacrylate, 2-hydroxypropyl methacrylate and 3-hydroxypropyl methacrylate, diethylene glycol monoacrylate, dipropylene glycol monomethacrylate, diethylene glycol momomethacrylates and the like. Acrylamide, methylol acrylamide, methacrylamide and methylol methacrylamide may also be used as monomers in forming the block copolymers.

In preparing hydroxyalkyl acrylates and methacrylates a small amount of the corresponding diacrylate or dimethacrylate is normally formed. These materials need not be removed for they may contribute to the hardness and resistance of the coating to abrasions, scratches and solvents as well as serve as crosslinking agents. Generally not over 2% by weight of these by-products is desirable.

A small amount (e.g., up to about 10 percent by monomer weight) of an ethylenically unsaturated acid may also be present in the monomer polymerized by the polymeric polyperoxycarbamate. Among such ethylenically unsaturated acids are acrylic, cinnamic, crotonic, methacrylate, itaconic, aconitic, maleic, fumaric, measaconic and citraconic acids. Partial esters of these acids may also be added in minor quantities. Exemplary of such partial esters are mono-2-hydroxypropyl itaconate, mono-2-hydroxyethyl citraconate, mono-2-hydroxypropyl aconitate, monoethyl itaconate and the like.

The prepolymer used in forming the polymeric peroxycarbamate must be one which forms a polyurethane block which is not soluble in or degradable by moisture. In other words, the polyurethane block must remain stable when subjected to moisture, water and cleaning solvents such as ammonia. The polyurethane block may be capable of absorbing or adsorbing some moisture, a property which is believed to contribute to the nonfogging property of the coating film of block copolymer. Generally, polyethers of relatively high molecular weights (for example, 2000 and above) are preferred as the prepolymer component. However, polyesters which give rise to polyurethane blocks meeting the requirement for resistance to water and solvents may also be used. Exemplary of the polyethers which are preferred are the polyethylene glycols sold by Union Carbide Corporation under the Registered Trademark "Carbowax." Exemplary of the polyesters are those of adipic acid, such as ethylenepropylene adipate and butylene adipate.

The amount of polyurethane in any one block copolymer of the type used determines to a large extent the flexibility of the nonfogging film coating. Since the polyurethane blocks impart flexibility, it follows that increased flexibility is attained with increased polyurethane content. Since, however, the polyurethanes are generally more susceptible to degradation by water or solvents over extended periods of time, the optimum amount of polyurethane in the block copolymer must be a balance of these two factors for any one use for the resulting treated nonfogging surface. For example, if the nonfogging coating is to be applied to transparent wrapping material for foods stored at low temperatures, then the factor of flexibility is more important than that of long-time resistance to water, solvents, abrasion and scratching and a greater amount of polyurethane may be incorporated into the block copolymer to attain flexibility. If, on the other hand, the nonfogging coating is to be applied to an automobile windshield or to a bathroom mirror for example, then flexibility is of no importance and resistance to water, cleansing agents, solvents, abrasion and scratching is of major importance.

The amount of polyurethane present in the block copolymer may be controlled by the molecular weight of the prepolymer (e.g., polyether) used, the reaction conditions and reactants used and most importantly of all by the use of chain extenders such as butane diol. The use of such chain extenders is known and it is within the skill in the art to adjust the chain length of the polymeric peroxycarbamate to obtain a block copolymer having the desired quantity of polyurethane blocks. The amount of polyurethane in the block copolymer will generally range between about 10 and 40 weight percent of the block copolymer, the amount depending upon the factors discussed.

If desired, crosslinking of the block copolymer may be accomplished to give the finished nonfogging coating additional strength and additional resistance to abrasion, wear and cleansing. Before the block copolymer is applied to the surface to be rendered nonfogging, any well-known crosslinking agent (e.g., ethylene glycol dimethacrylate, divinyl benzene, divinyl toluene) may be added up to about 20% by weight of the block copolymer. The crosslinking agent should be one which does not detract from the transparency or other physical properties of the coating. It is also within the scope of this invention to mix a minor amount (i.e., less than 50% by block copolymer weight) of a polyepoxide with the block copolymer. Cycloaliphatic diepoxides such as vinyl cyclohexane dioxide, 3,4-epoxycyclohexylmethyl- $3',4'$-epoxycyclohexane carboxylate, butadiene diepoxide, bisphenol A-epichlorohydrin and the like are illustrative of the polyepoxides which may be added.

The block copolymer film coating is conveniently applied in solution to the surface to be rendered nonfogging. Suitable solvents include, but are not limited to, blends of ethylene glycol monomethyl ether and methylethyl ketone, ethyl alcohol, dimethyl formamide, methyl alcohol, blends of the ethylene glycol monomethyl ether with acetone and the like. Final coating film thicknesses should range between about 0.25 to 10 mils thick, while from 1–3 mils is preferred. The final coating film thickness desired will determine the solids concentration of the solution or dispersions used. Generally, concentration of from about 5 to 20% by weight will be satisfactory.

The coating solution may be applied by any suitable technique such as by dipping, spraying, painting, knife-coating or by printing. Subsequent to application of the coating liquid, the solvent is removed by heating to leave a transparent film tightly adhered to the substrate. As an alternative to depositing a film-forming coating liquid to the surface to be rendered nonfogging, it is also within the scope of this invention to preform the thin film of the blockcopolymer and adhere it with an inert transparent adhesive to the surface to be rendered antifogging. Such an adhesive may be a cured-in-place monomer, along with a suitable catalyst, such as a transparent acrylic monomer.

The substrate to which the nonfogging film is applied may have a glass, plastic or metal (including metallized) surface. Illustrative of the types of surfaces which can be made nonfogging are vehicle windows such as those in automobiles, buses, aeroplanes and the like, optical lenses (glass and plastic) in eyeglasses, photographic equipment and binoculars; mirrors; and transparent packaging films.

The following examples, which are illustrative and not meant to be limiting, are given to provide an additional description of the invention.

EXAMPLE 1

Into a flask equipped with an agitator and heated by means of a controlled temperature oil bath were charged 292 grams of toluene, 500 grams of a polyethylene glycol (molecular weight range of 3000 to 3700), 93.7 grams of bis(4-isocyanatocyclohexyl) methane and 0.5 gram of dibutyl tin dilaurate.

The flask was placed under a nitrogen atmosphere and the contents were rapidly agitated and heated to 70°C. After 3 hours at 70°C, 32.7 grams of 2,5-dimethylethyl-2,5-bis-(hydroperoxy) hexane, 2.66 grams of dibutyl tin dilaurate and 189 grams of toluene were added. The solution was heated and stirred under nitrogen at 50°C for a period of 4 hours to form a solution of polymeric peroxycarbamate.

Thirty-five grams of the polymeric peroxycarabamate solution (20 grams on a dry solids basis) was charged in a flask equipped with a stirrer and heated in an oil bath. To this were added 162 grams of 2-hydroxyethyl methacrylate, 18 grams of acrylic acid, and 800 grams of ethylene glycol monomethyl ether. The reaction was carried out under $CO_2$ for six hours at 85°C. The reaction was terminated and the block copolymer was precipitated in water, filtered, and dried under vacuum at 45°C. A 90% yield was obtained and the block copolymer was approximately 10% mole concentration of urethane and 90% mole concentration of acrylic segments.

The polymer was dissolved at 20% by weight concentration in a 75/25 blend of ethylene glycol monomethyl ether and methylethyl ketone. The solution was applied to a clean glass plate and dried in a circulating air oven at 120°C. The resulting coating was light transmitting and optically clear, adherent to the glass, and did not fog upon exposure to hot moist air.

EXAMPLE 2

Ten grams of the block copolymer of Example 1 was dissolved in 70 grams of a 75/25 blend of ethylene glycol monoethyl ether/methylethyl ketone. To this solution were added 0.27 gram of ethylene glycol dimethacrylate as a cross linking agent and 0.02 gram of t-butyl peroctoate as a catalyst. The resulting solution was applied to a clean glass plate at 4 mils wet thickness and then dried and cured in a circulating air oven for 16 hours at 120°C. The resulting film coating was optically clear, adherent to the glass, hard and resistant to abrasion and scratching. The film coating did not fog when exposed to hot moist air.

EXAMPLE 3

An equal amount of cycloaliphatic diepoxide resin (sold as ERL-4221 by Union Carbide Corporation) and identified as 3,4-epoxycyclohexylmethyl -3′,4′-epoxycyclohexane carboxylate was substituted for the ethylene glycol dimethacrylate in Example 2, but the t-butyl peroctoate was eliminated. The resulting solution was applied in the same manner as in Example 2. The non-fogging coating deposited on the glass plate exhibited essentially the same properties as that formed in Example 2.

EXAMPLE 4

Into a flask equipped as described in Example 1 were added 500 grams of the polyethylene glycol, 93.7 grams of the diisocyanate used in Example 1, 0.5 gram of dibutyl tin dilaurate and 292 grams of toluene. The reaction was carried out under nitrogen for 3 hours at 70°C. At this point, 16.3 grams of the dihydroperoxide of Example 1, 7.9 grams of butanediol, 2.66 grams of dibutyl tin dilaurate, and 189 grams of toluene were added and a reaction continued at 50°C for a period of 4 hours.

Into a flask equipped with stirrer and heated in an oil bath were charged 71 grams of the polymeric peroxycarbamate solution prepared (40 grams of the poly(peroxycarbamate) on a dry solids basis), 144 grams of 2-hydroxyethyl methacrylate, 16.0 grams of acrylic acid, and 800 grams of ethylene glycol monomethyl ether. The reaction was carried out under $CO_2$ for 6 hours at 85°C, terminated, and the block copolymer was precipitated in water, filtered, and dried under vacuum as in Example 1. The product block copolymer had a weight ratio of polyurethane/polyacrylic of about 20/80.

The product was dissolved at a concentration of 20% by weight in a 75/25 blend of ethylene glycol monomethyl ether and methylethyl ketone, applied to a clean glass plate and dried in a circulating air oven at 120°C. The resulting coating was light transmitting, optically clear, adherent to the glass, and did not fog under exposure to hot, moist air. The coating may be crosslinked as in Example 2 or 3 to enhance its durability and resistance to washing in water and detergents.

EXAMPLE 5

A flask similar to that used in Example 1 was charged with 500 grams of polyethylene glycol having a molecular weight range of 3000 to 3700, 93.7 grams of bis(4-isocyanatocyclohexyl) methane, 0.5 gram of butyl tin dilaurate and 292 grams of toluene. The reaction was carried out under nitrogen for 3 hours at 70°C. At this point, 8.1 grams of 2,5-dimethylethyl-2,5-bis(hydroxperoxy) hexane, 12 grams of butanediol as a chain extender, 2.66 grams of butyl tin dilaurate, and 189 grams of toluene were added to the flask contents and the reaction continued for 4 hours at 50°C.

Into a flask equipped with a stirrer and heated in an oil bath was charged 142 grams of the above reaction solution (80 grams of poly(peroxycarbamate) on a dry solids basis), 108 grams of 2-hydroxyethyl methacrylate, 12 grams of acrylic acid, and 800 grams of ethylene glycol momomethylether. The reaction was carried out under $CO_2$ for 6 hours at 85°C, terminated and the resulting block copolymer precipitated in water, filtered, and dried under vacuum as in Example 4.

The product block copolymer, which had a polyurethane polyacrylic weight ratio of 40/60, was dissolved at 20% concentration by weight in a 75/25 blend of ethylene glycol monomethyl ether and methylethyl ketone, applied as a thin coating to a clean glass plate and dried at 120°C. The resulting coating was light transmitting and optically clear and did not fog upon exposure to hot moisture. The coating of this example was softer and much more flexible than that of Example 4 due to the relatively large amount of polyurethane present.

EXAMPLE 6

500 grams of poly(butylene adipate), 131 grams of bis(4-isocyanatocyclohexyl)methane, 300 grams of toluene and 0.5 gram of butyl tin dilaurate were reacted for 3 hours at 80°C under nitrogen. Then 23.5 grams of 2,5-dimethylethyl-2,5-bis(hydroperoxy) hexane, 11.2 grams of butanediol, 2.7 grams of butyl tin dilaurate and 190 grams of toluene were added. This solution was heated and stirred under nitrogen at 50°C for a period of 4 hours.

The block copolymer was prepared by reacting 20 grams of the polymeric peroxycarbamate prepared, 162 grams of 2-hydroxyethyl methacrylate, 18 grams of acylic acid in 800 grams of ethylene glycol momomethyl ether under $CO_2$ for 6 hours at 85°C. The reaction was terminated and the block copolymer was precipitated in water, filtered, and dried under vacuum at 45°C. A 90% yield was obtained. The block copolymer was approximately 10% mole concentration of urethane and 90% mole concentration of acrylic segments.

The polymer was dissolved at 20% by weight concentration in a 75/25 blend of ethylene glycol monomethyl ether and methylethyl ketone. The solution was applied to a clean glass plate and dried in a circulating air oven at 120°C. The resulting coating was light transmitting and optically clear, adherent to the glass, and did not fog upon exposure to hot, moist air.

In using a block copolymer containing alternative blocks of polyurethanes and hydrophilic polyacrylics it is possible to form a nonfogging coating which in performance is equal to or better than the presently available nonfogging coatings and which may be made with a desired degree of flexibility.

It will thus be seen that the objects set forth above, among those made apparent from the preceding description, are efficiently attained and, since certain changes may be made in carrying out the above method and in the article set forth without departing from the scope of the invention, it is intended that all matter contained in the above description shall be interpreted as illustrative and not in a limiting sense.

We claim:

1. A method for rendering a surface of a substrate nonfogging, comprising the step of adhering to said surface a thin transparent film of a block copolymer characterized as containing alternating blocks of a hydrophilic polyetherurethane and of a hydrophilic polyacrylic which is a copolymer of a hydroxy-substituted acrylate and an ethylenically unsaturated acid, the weight ratio of said polyetherurethane to said copolymer ranging between about 10 to 90 and about 40 to 60.

2. A method in accordance with claim 1 wherein said adhering step comprises forming a solution of said block copolymer and applying said solution to said surface.

3. A method in accordance with claim 2 including the step of adding a crosslinking agent for said block copolymer to said solution.

4. A method in accordance with claim 1 wherein said adhering step comprises fixing a preformed film of said block copolymer to said surface through a transparent adhesive.

5. A method in accordance with claim 4 wherein said adhesive is a polymerized-in-place monomer.

6. A method in accordance with claim 1 wherein said polyetherurethane blocks in said block copolymer are formed by reacting a polyethylene glycol having a molecular weight of at least 2000 with a diisocyanate.

7. A method in accordance with claim 6 including the step of adding a chain extender to said polyethylene glycol whereby said ratio of polyetherurethane/polyacrylic is increased and the flexibility of said film of block copolymer is increased.

8. A method in accordance with claim 1 wherein said hydroxy-substituted acrylate in said copolymer is 2-hydroxyethyl methacrylate.

9. A method in accordance with claim 1 wherein said copolymer comprises copolymerized 2-hydroxyethyl methacrylate and acrylic acid.

10. A method in accordance with claim 1 wherein said thin film ranges in thickness between about 0.25 and 10 mils.

11. A method in accordance with claim 1 wherein said ethylenically unsaturated acid in said copolymer is present in an amount up to about 10% by weight of said hydroxy-substituted acrylate.

12. An article of manufacture comprising a substrate having on at least one surface thereof a nonfogging, transparent coating comprising a thin transparent film of a block copolymer, the blocks of which are characterized as being a hydrophilic polyetherurethane alternating with a hydrophilic polyacrylic which is a copolymer of a hydroxy-substituted acrylate and an ethylenically unsaturated acid, the weight ratio of said polyetherurethane to said copolymer ranging between about 10 to 90 and about 40 to 60.

13. An article in accordance with claim 12 wherein said substrate is glass.

14. An article in accordance with claim 13 wherein said glass is in the form of an optical lens.

15. An article in accordance with claim 13 wherein said glass is a contoured window.

16. An article in accordance with claim 12 wherein said substrate is a mirror.

17. An article in accordance with claim 12 wherein said substrate is a plastic.

18. An article in accordance with claim 12 wherein said substrate is a metal.

19. An article in accordance with claim 12 wherein said substrate is flexible.

20. An article in accordance with claim 19 wherein said flexible substrate is transparent packaging film.

21. An article in accordance with claim 12 further characterized in that said block copolymer is crosslinked.

22. An article in accordance with claim 12 wherein said polyetherurethane blocks in said block copolymer are formed by reacting a polyethylene glycol having a molecular weight of at least 2000 with a diisocyanate.

23. An article in accordance with claim 22 wherein the polyether chain in said polyetherurethane block is extended whereby the flexibility of said film of block copolymer is increased.

24. An article in accordance with claim 12 wherein said hydroxy-substituted acrylate in said copolymer is 2-hydroxyethyl methacrylate.

25. An article in accordance with claim 12 wherein said copolymer comprises copolymerized 2-hydroxyethyl methacrylate and acrylic acid.

26. An article in accordance with claim 12 wherein said thin film ranges in thickness between about 0.25 and 10 mils.

27. An article in accordance with claim 12 wherein said ethylenically unsaturated acid in said copolymer is present in an amount up to about 10% by weight of said hydroxy-substituted acrylate.

* * * * *